US009366125B2

(12) United States Patent
Abass et al.

(10) Patent No.: US 9,366,125 B2
(45) Date of Patent: Jun. 14, 2016

(54) CARBONATE BASED SLURRY FRACTURING USING SOLID ACID FOR UNCONVENTIONAL RESERVOIRS

(71) Applicant: Saudi Arabian Oil Company, Dhahran (SA)

(72) Inventors: Hazim Hussein Abass, Dhahran (SA); Abdulrahman Abdulaziz Al-Mulhem, Dhahran (SA); Mirajuddin R. Khan, Al-Khobar North (SA); Victor V. Hilab, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/481,963

(22) Filed: Sep. 10, 2014

(65) Prior Publication Data
US 2015/0068746 A1    Mar. 12, 2015

Related U.S. Application Data

(60) Provisional application No. 61/876,542, filed on Sep. 11, 2013.

(51) Int. Cl.
E21B 43/267    (2006.01)
C09K 8/14    (2006.01)
(Continued)

(52) U.S. Cl.
CPC .............. E21B 43/267 (2013.01); C04B 28/04 (2013.01); C09K 8/14 (2013.01); C09K 8/46 (2013.01)

(58) Field of Classification Search
None
See application file for complete search history.

(56) References Cited

U.S. PATENT DOCUMENTS 2,832,415 A    10/1955    Reistle, Jr.
2,959,223 A *  11/1960    Harmon ................ E21B 43/261
                                                      166/281

(Continued)

FOREIGN PATENT DOCUMENTS

GB          1388909         11/1972
WO     2004/020788 A1     3/2004

OTHER PUBLICATIONS

PCT International Search Report and the Written Opinion; dated Feb. 24. 2015; International Application No. PCT/US2014/054652; International File Date: Sep. 9, 2014.

(Continued)

Primary Examiner — Angela M DiTrani
Assistant Examiner — Anuradha Ahuja
(74) Attorney, Agent, or Firm — Bracewell LLP; Constance G. Rhebergen; Kevin R. Tamm

(57) ABSTRACT

A method of using a slurry-like fracturing fluid for hydraulic fracturing in an unconventional reservoir: injecting the slurry-like fracturing fluid into the unconventional reservoir, the slurry-like fracturing fluid comprises a particulate portion and a slurry water, the particulate portion comprises a solid acid component, injecting the slurry-like fracturing fluid is operable to generate a network of fractures, the slurry-like fracturing fluid is operable to reduce a reservoir temperature from a resting reservoir temperature, permitting the slurry-like fracturing fluid to cure into a permeable bed, allowing the reservoir temperature to return to the resting reservoir temperature to trigger the hydrolysis of the solid acid, hydrolyzing the solid acid to produce a liquid acid, and stimulating the network of fractures with the liquid acid to increase permeability of the permeable bed in the network of fractures in the unconventional reservoir, the increased permeability operable to create a sweet spot.

19 Claims, 4 Drawing Sheets

(51) Int. Cl.
*C04B 28/04* (2006.01)
*C09K 8/46* (2006.01)

(56) References Cited

U.S. PATENT DOCUMENTS

| | | | |
|---|---|---|---|
| 3,561,532 | A | 2/1971 | Fletcher et al. |
| 3,709,300 | A * | 1/1973 | Pye .................. E21B 43/267 |
| | | | 166/280.1 |
| 4,460,627 | A * | 7/1984 | Weaver .................. C09K 8/50 |
| | | | 427/212 |
| 5,560,427 | A | 10/1996 | Jones |
| 6,202,751 | B1 | 3/2001 | Chatterji et al. |
| 6,239,183 | B1 | 5/2001 | Farmer et al. |
| 7,135,231 | B1 | 11/2006 | Sinclair et al. |
| 7,971,643 | B2 | 7/2011 | Brannon et al. |
| 8,075,997 | B2 | 12/2011 | Smith et al. |
| 8,178,477 | B2 | 5/2012 | Skala et al. |
| 8,276,664 | B2 | 10/2012 | Gupta |
| 8,448,706 | B2 | 5/2013 | Hughes et al. |
| 8,459,353 | B2 | 6/2013 | Hughes et al. |
| 2006/0073980 | A1 | 4/2006 | Brannon et al. |
| 2008/0039347 | A1 * | 2/2008 | Welton .................. C09K 8/08 |
| | | | 507/213 |
| 2009/0025933 | A1 * | 1/2009 | Garcia-Lopez de Victoria .................. C09K 8/528 |
| | | | 166/279 |
| 2009/0065253 | A1 * | 3/2009 | Suarez-Rivera ........ E21B 43/26 |
| | | | 175/50 |
| 2011/0005760 | A1 * | 1/2011 | Hartman .................. C09K 8/536 |
| | | | 166/308.1 |
| 2011/0030957 | A1 | 2/2011 | Constantz et al. |
| 2011/0160096 | A1 * | 6/2011 | Roddy .................. G06F 19/322 |
| | | | 507/100 |
| 2012/0073813 | A1 | 3/2012 | Zamora et al. |
| 2012/0285690 | A1 | 11/2012 | Weaver et al. |
| 2012/0302470 | A1 | 11/2012 | Pollard et al. |
| 2012/0318506 | A1 | 12/2012 | Benkley et al. |
| 2013/0161003 | A1 | 6/2013 | Makarychev-Mikhailov et al. |
| 2014/0144635 | A1 * | 5/2014 | Nguyen .................. E21B 43/267 |
| | | | 166/281 |
| 2014/0290943 | A1 * | 10/2014 | Ladva .................. E21B 43/267 |
| | | | 166/280.1 |

OTHER PUBLICATIONS

M.B. Dusseault et al., "Disposal of Produced Solids by Slurry Fracture Injection", The Fifth Petroleum Conference of the South Saskatchewan Section, No. 41, Petroleum Society of CIM and CANMET;Oct. 18-20, 1993; 10 pages.

H.A. Nasr-El-Din et al., "Acid Fracturing of Gas Wells by Use of an Acid Precursor in the Form of Solid Beads: Lessons Learned From First Field Application", SPE110895; SPE Annual Tech Conference & Exhibition; Anaheim California, 1-14, 2007; pp. 320-335.

* cited by examiner

CARBONATE BASED SLURRY FRACTURING USING SOLID ACID FOR UNCONVENTIONAL RESERVOIRS

RELATED APPLICATIONS

This application claims priority to U.S. Provisional Patent Application No. 61/876,542, filed Sep. 11, 2013, which is incorporated herein by reference in its entirety.

FIELD OF THE INVENTION

This invention relates to hydraulic fracturing fluids in unconventional reservoirs. More specifically, this invention relates to slurry-like hydraulic fracturing fluids for use in unconventional reservoirs. This invention also relates to technology to facilitate fracturing while drilling.

BACKGROUND OF THE INVENTION

Unconventional gas is produced or extracted using techniques other than conventional oil well methods. Extracting unconventional gas is becoming more important, as conventional oil reserves are becoming more scarce.

Typically, unconventional gas is found in reservoirs which are gas bearing but very tight. These unconventional reservoirs include reservoirs such as tight sands, shale gas, shale oil, coalbed methane, tight carbonate, and gas hydrate reservoirs. In general, these reservoirs are largely impermeable. Thus, the horizontal wells in these reservoirs can be hydraulically fractured in many stages using a hydraulic fracturing technique known as multistage hydraulic fracturing in order for these reservoirs to produce gas or oil in commercial quantities. The process of hydraulic fracturing entails pumping fracturing fluid into the region. Fracturing fluid is generally composed of water mixed with proppant and/or resin coated proppant and chemicals such as gelling agents, crosslinkers, and breakers. The fracturing fluid is pumped into the reservoir at high pressures. This fracturing pressure must exceed the formation parting pressure or fracturing gradient to break down the formation and propagate a fracture. The induced hydraulic fracture will propagate further into the formation and activate natural fractures. The proppant in the fracturing fluid will fill the induced fractures, thus making those fractures conductive channels. Upon completion, the well is shut down allowing the breaker to activate and break the crosslinked gel. The well is put on production for fracture cleanup, which can take weeks. Usually, several stages of this fracturing treatment are carried out in a single well to create maximum stimulated reservoir volume. Hydraulic fracturing treatments are expensive and consume massive amounts of water, proppant, and chemicals. Thus, there is a need for developing improved fracturing treatments that do not require expensive components such as proppants.

SUMMARY

This invention relates to hydraulic fracturing fluids in unconventional reservoirs. More specifically, this invention relates to slurry-like hydraulic fracturing fluids for use in unconventional reservoirs. This invention also relates to technology to facilitate fracturing while drilling.

In one aspect, a method of using a slurry-like fracturing fluid for hydraulic fracturing in an unconventional reservoir is provided. The method includes the steps of injecting the slurry-like fracturing fluid into the unconventional reservoir, wherein the slurry-like fracturing fluid comprises a particulate portion and a slurry water, the slurry water operable to adjust the viscosity of the slurry-like fracturing fluid, such that the slurry-like fracturing fluid is capable of being pumped into the unconventional reservoir and the slurry-like fracturing fluid is capable of fracturing the unconventional reservoir, wherein the particulate portion includes a calcium carbonate component, a cement component, a sand component, a bentonite component, and a solid acid component, wherein injecting the slurry-like fracturing fluid is operable to generate a network of fractures in the unconventional reservoir, wherein the slurry-like fracturing fluid is operable to reduce a reservoir temperature from a resting reservoir temperature to a reduced temperature, permitting the slurry-like fracturing fluid to cure into a permeable bed in the network of fractures in the unconventional reservoir, allowing the reservoir temperature to return to the resting reservoir temperature, wherein the resting reservoir temperature is operable to trigger the hydrolysis of the solid acid with a water source, where the reservoir temperature increases while the slurry-like fracturing fluid cures into the permeable bed in the network of fractures, hydrolyzing the solid acid with the water source, wherein the hydrolysis of the solid acid is operable to produce a liquid acid, and stimulating the network of fractures in the unconventional reservoir with the liquid acid, such that the liquid acid etches the permeable bed and the liquid acid etches the unconventional reservoir thereby increasing permeability of the permeable bed in the network of fractures in the unconventional reservoir, the increased permeability operable to create a sweet spot.

In certain aspects of the present invention, the calcium carbonate component is obtained from a naturally occurring source. In certain aspects of the present invention, the cement component is Portland cement. In certain aspects of the present invention, the sand component is a silica based sand. In certain aspects of the present invention, the bentonite component is selected from the group consisting of sodium bentonite and calcium bentonite. In certain aspects of the present invention, the solid acid component is selected from the group consisting of sulfamic acid, chloroacetic acid, carboxylic acid, trichloroacetic acid, and combinations of the same. In certain aspects of the present invention, the particulate portion is between 20-80% wt. calcium carbonate component, 5-25% wt. cement component, 5-30% wt. sand component, 2-10% wt. bentonite component, and 5-30% wt solid acid component. In certain aspects of the present invention, the particulate portion is 30% wt. calcium carbonate component, 25% wt. cement component, 15% wt. sand component, 10% wt. bentonite component, and 20% wt solid acid component. In certain aspects of the present invention, the slurry water is a brine. In certain aspects of the present invention, the slurry water is a salt solution. In certain aspects of the present invention, the brine comprises potassium chloride. In certain aspects of the present invention, the salt solution is a potassium chloride solution. In certain aspects of the present invention, the solid acid component is encapsulated. In certain aspects of the present invention, the water source is a formation brine. In certain aspects of the present invention, the water source is the slurry water. In certain aspects of the present invention, the unconventional reservoir is a tight sand reservoir. In certain aspects of the present invention, the unconventional reservoir is a shale reservoir. In certain aspects of the present invention, the resting reservoir temperature is greater than 100° C.

A method of using a slurry-like fracturing fluid for hydraulic fracturing in an unconventional reservoir, the method including the steps of injecting the slurry-like fracturing fluid into the unconventional reservoir, wherein the slurry-like fracturing fluid comprises a particulate portion and a slurry water, the slurry water operable to adjust the viscosity of the slurry-like fracturing fluid, such that the slurry-like fracturing fluid is capable of being pumped into the unconventional reservoir and the slurry-like fracturing fluid is capable of fracturing the unconventional reservoir, wherein the particulate portion includes a calcium carbonate component, wherein the calcium carbonate is 30 wt % of the particulate portion, a cement component, wherein the cement component is 25% wt. of the particulate portion, a sand component, wherein the sand component is 15% wt. of the particulate portion, bentonite, wherein the bentonite component is 10% wt. of the particulate portion, a solid acid component, wherein the solid acid component is 20% wt of the particulate portion, wherein injecting the slurry-like fracturing fluid is operable to generate a network of fractures in the unconventional reservoir, wherein the slurry-like fracturing fluid is operable to reduce a reservoir temperature from a resting reservoir temperature to a reduced temperature, permitting the slurry-like fracturing fluid to cure into a permeable bed in the network of fractures in the unconventional reservoir, allowing the reservoir temperature to return to the resting reservoir temperature, wherein the resting reservoir temperature is operable to trigger the hydrolysis of the solid acid with a water source, where the reservoir temperature increases while the slurry-like fracturing fluid cures into the permeable bed in the network of fractures, hydrolyzing the solid acid with the water source, wherein the hydrolysis of the solid acid is operable to produce a liquid acid, and stimulating the network of fractures in the unconventional reservoir with the liquid acid, such that the liquid acid etches the permeable bed and the liquid acid etches the unconventional reservoir thereby increasing permeability of the permeable bed in the network of fractures in the unconventional reservoir, the increased permeability operable to create a sweet spot.

DETAILED DESCRIPTION OF THE INVENTION

Figure 1:
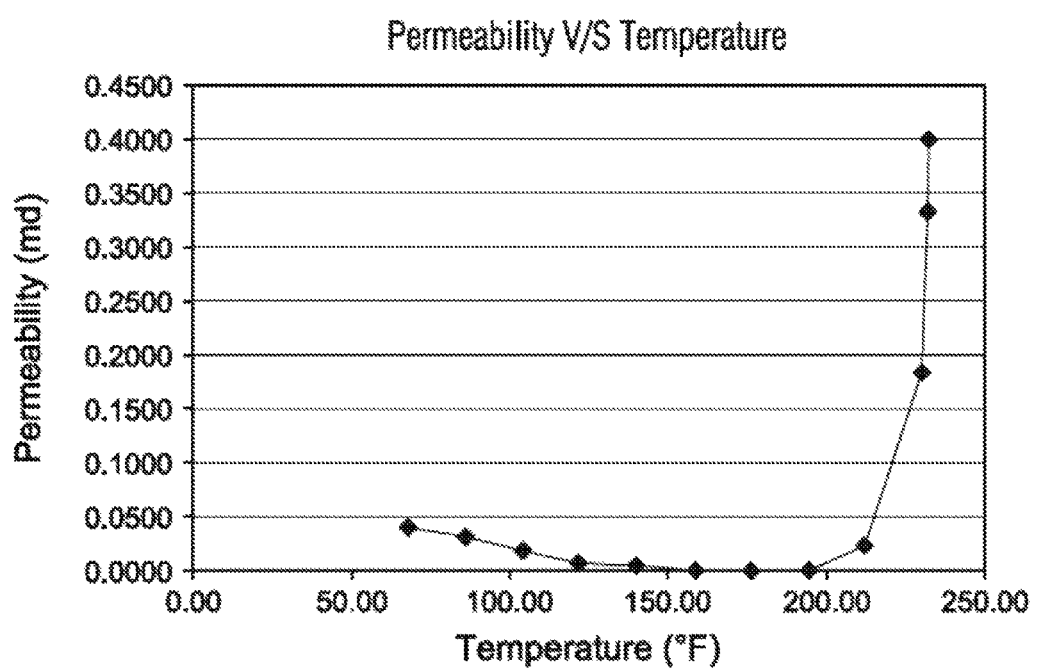
FIG. 1 shows the permeability of a slurry-like fracturing fluid according to an embodiment of the invention from room temperature to resting reservoir temperature.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

In one aspect, the invention provides a slurry-like fracturing fluid for use in hydraulic fracturing operations. The slurry-like fracturing fluid includes slurry water and a particulate portion. The particulate portion includes a calcium carbonate component, a cement component, a sand component, and a solid acid component. In some embodiments, the particulate portion also includes a bentonite component.

The calcium carbonate component can be from naturally occurring sources or it can be man-made. Naturally occurring sources of calcium carbonate include rocks, shells of marine organisms, shells of snails, eggshells, and agricultural lime. In some embodiments, the calcium carbonate is about 20-80% wt. of the particulate portion of the slurry-like fracturing fluid. In some embodiments, the calcium carbonate is about 30-70% wt. of the particulate portion of the slurry-like fracturing fluid. In some embodiments, the calcium carbonate is about 30-50% wt. of the particulate portion of the slurry-like fracturing fluid. In some embodiments, the calcium carbonate is about 25-35% wt. of the particulate portion of the slurry-like fracturing fluid. In some embodiments, the calcium carbonate component is about 30% wt. of the particulate portion. In some embodiments, the calcium carbonate component is about 35% wt. of the particulate portion. In some embodiments, the calcium carbonate component is about 40% wt. of the particulate portion. In some embodiments, the calcium carbonate component is about 45% wt. of the particulate portion. In some embodiments, the calcium carbonate component is about 50% wt. of the particulate portion. In some embodiments, the calcium carbonate component is about 55% wt. of the particulate portion. In some embodiments, the calcium carbonate component is about 60% wt. of the particulate portion. In some embodiments, the calcium carbonate component is about 65% wt. of the particulate portion. In some embodiments, the calcium carbonate component is about 70% wt. of the particulate portion. In some embodiments, the calcium carbonate component is about 75% wt. of the particulate portion. In some embodiments, the calcium carbonate component is about 80% wt. of the particulate portion.

The cement component is a binder that is capable of setting and hardening. In some embodiments, the cement component is a hydraulic cement. In further embodiments, the hydraulic cement is a Portland cement. In some embodiments, the cement component is about 5-30% wt. of the particulate portion of the slurry-like fracturing fluid. In some embodiments, the cement component is about 10-30% wt. of the particulate portion of the slurry-like fracturing fluid. In some embodiments, the cement component is about 15-30% wt. of the particulate portion of the slurry-like fracturing fluid. In some embodiments, the cement component is about 20-30% wt. of the particulate portion of the slurry-like fracturing fluid. In some embodiments, the cement component is about 5% wt. of the particulate portion. In some embodiments, the cement component is about 10% wt. of the particulate portion. In some embodiments, the cement component is about 15% wt. of the particulate portion. In some embodiments, the cement component is about 20% wt. of the particulate portion. In some embodiments, the cement component is about 25% wt. of the particulate portion.

The sand component is a naturally occurring granular material that is made of fine rock and mineral particles. The composition of the sand component can vary widely depending on the source of the sand, as sand composition varies depending on the rock sources and conditions of the region from which it was obtained. In some embodiments, the sand component includes silica based sands. In some embodiments, the sand component will include a mixture of silica based sands. The particle sizes of the sand component can be fine, medium, or coarse. In some embodiments, the sand component includes a wide range of particle sizes. In some embodiments, the sand component includes a narrow range of particle sizes. The sand component is bound in the permeable bed. In some embodiments, the sand component is about 5-30% wt. of the particulate portion of the slurry-like fracturing fluid. In some embodiments, the sand component is about 10-25% wt. of the particulate portion of the slurry-like fracturing fluid. In some embodiments, the sand component is about 10-20% wt. of the particulate portion of the slurry-like fracturing fluid. In some embodiments, the sand component is about 5% wt. of the particulate portion. In some embodiments, the sand component is about 10% wt. of the particulate portion. In some embodiments, the sand component is about 15% wt. of the particulate portion. In some embodiments, the sand component is about 20% wt. of the particulate portion. In some embodiments, the sand component is about 25% wt. of the particulate portion. In some embodiments, the sand component is about 30% wt. of the particulate portion.

In further embodiments, the sand component is replaced with other types of particulate material. Other types of particulate materials that can be used in embodiments of the invention include bauxite, carbalite, chalk, sea shells, coal, and the like.

In some embodiments, the particulate portion also includes a bentonite component. The bentonite component is an impure clay made mostly of montmorillonite. The bentonite component can include potassium bentonite, sodium bentonite, calcium bentonite, and aluminum bentonite. In some embodiments, the bentonite component includes a mixture of bentonites. The amount of bentonite used can be adjusted in order to achieve a viscosity of the composition such that the viscosity is appropriate for the pumping of the fracturing fluid. In some embodiments, the bentonite component is about 2-10% wt. of the particulate portion of the slurry-like fracturing fluid. In some embodiments, the bentonite component is about 4-10% wt. of the particulate portion of the slurry-like fracturing fluid. In some embodiments, the bentonite component is about 6-10% wt. of the particulate portion of the slurry-like fracturing fluid. In some embodiments, the bentonite component is about 8-10% wt. of the particulate portion of the slurry-like fracturing fluid. In some embodiments, the bentonite component is about 2% wt. of the particulate portion. In some embodiments, the bentonite component is about 3% wt. of the particulate portion. In some embodiments, the bentonite component is about 4% wt. of the particulate portion. In some embodiments, the bentonite component is about 5% wt. of the particulate portion. In some embodiments, the bentonite component is about 6% wt. of the particulate portion. In some embodiments, the bentonite component is about 7% wt. of the particulate portion. In some embodiments, the bentonite component is about 8% wt. of the particulate portion. In some embodiments, the bentonite component is about 9% wt. of the particulate portion. In some embodiments, the bentonite component is about 10% wt. of the particulate portion.

The solid acid component is any acid that is inert until it is triggered by reaching a temperature to begin hydrolyzing with a water source. Generally, the solid acids are temperature activated acids. In at least one embodiment of the present invention, the solid acid component is selected so that the triggering temperature is a resting reservoir temperature. However, any acid that will become active after the slurry-like fracturing fluid is cured is an acceptable acid. In some embodiments, the solid acids include sulfamic acid, chloroacetic acid, carboxylic acid, and trichloroacetic acid. As the solid acid becomes liquid acid it will stimulate the cured slurry-like fracturing fluid, thus making it more permeable for the gas and making the created fractures conductive. In some embodiments, the solid acid component is about 5-30% wt. of the particulate portion of the slurry-like fracturing fluid. In some embodiments, the solid acid component is about 5-10% wt. of the particulate portion of the slurry-like fracturing fluid. In some embodiments, the solid acid component is about 10-15% wt. of the particulate portion of the slurry-like fracturing fluid. In some embodiments, the solid acid component is about 15-20% wt. of the particulate portion of the slurry-like fracturing fluid. In some embodiments, the solid acid component is about 20-25% wt. of the particulate portion of the slurry-like fracturing fluid. In some embodiments, the solid acid component is about 25-30% wt. of the particulate portion of the slurry-like fracturing fluid. In some embodiments, the solid acid component is about 5% wt. of the particulate portion. In some embodiments, the solid acid component is about 10% wt. of the particulate portion. In some embodiments, the solid acid component is about 15% wt. of the particulate portion. In some embodiments, the solid acid component is about 20% wt. of the particulate portion. In some embodiments, the solid acid component is about 25% wt. of the particulate portion. In some embodiments, the solid acid component is about 30% wt. of the particulate portion.

Slurry water is added to the particulate portion to make the slurry-like fracturing fluid. The slurry water adjusts the viscosity of the slurry-like fracturing fluid. The amount of slurry water added can vary depending on the required viscosity of the resulting slurry-like fracturing fluid. In general, the viscosity of the slurry-like fracturing fluid should be such that it can be pumped to a unconventional reservoir during actual field treatment to fracture the unconventional reservoir. In some embodiments, the slurry water is provided in the form of a brine. In further embodiments, the slurry water is provided in the form of a brine that includes salts such as potassium chloride, sodium chloride, and calcium chloride. In further embodiments, the slurry water is provided in the form of a salt solution. In further embodiments, the salt solution is a potassium chloride solution, sodium chloride solution, or calcium chloride solution.

The slurry-like fracturing fluid can further include encapsulated components, degradable components, and gaseous materials. Among the encapsulated components include an encapsulated acid, such that its action is delayed until its encapsulating coating is dissociated. Gaseous materials could include nitrogen or carbon dioxide that could be used to create slurryfoam compositions that increase the permeability of the slurry-like fracturing fluid as it cures.

A method of using the slurry-like fracturing fluid for hydraulic fracturing in an unconventional reservoir is provided. Exemplary unconventional reservoirs include tight sand, shale gas, tight carbonate, coalbed methane, shale oil, and gas hydrate reservoirs. In at least one embodiment of the present invention, the unconventional reservoir is a tight sand reservoir. In at least one embodiment of the present invention, the unconventional reservoir is a shale reservoir. In at least one embodiment of the present invention, the unconventional reservoir is a sandstone formation. The reservoir temperature of the unconventional reservoir is at a resting reservoir temperature prior to the introduction of the slurry-like fracturing fluid to the unconventional reservoir. In at least one embodiment of the present invention, the resting reservoir temperature is greater than about 100° C. (212° F.). In at least one embodiment of the present invention, the resting reservoir temperature is greater than about 111° C. (231.8° F.).

The slurry-like fracturing fluid, including the particulate portion and the slurry water as described herein, is injected into the unconventional reservoir. In at least one embodiment of the present invention, the slurry-like fracturing fluid is injected in a horizontal well. Injecting the slurry-like fracturing fluid generates a network of fractures in the unconventional reservoir. The network of fractures extends from the well into the unconventional reservoir. In at least one embodiment, injecting the slurry-like fracturing fluid causes a decrease in the reservoir temperature from the resting reservoir temperature to a reduced temperature.

The slurry-like fracturing fluid fills the network of fractures in the unconventional reservoir. The slurry-like fracturing fluid is then permitted to cure into a permeable bed in the network of fractures. In at least one embodiment of the present invention, the permeable bed is a solid porous carbonaceous bed filling the network of fractures in the unconventional reservoir. While the slurry-like fracturing fluid cures into the permeable bed, the reservoir temperature increases from the reduced temperature to the resting reservoir temperature. The reservoir temperature returns to the resting reservoir temperature triggering the hydrolysis of the solid acid with a water source. Exemplary sources useful as the water source include the slurry water present in the slurry-like fracturing fluid and formation brine present in the unconventional reservoir. The solid acid hydrolyzes with the water source to produce a liquid acid, including liquid-like acids.

The liquid acid etches the permeable bed. The liquid acid etches the unconventional reservoir. The liquid acid etching increases the permeability of the permeable bed in the network of fractures in the unconventional reservoir. In at least one embodiment of the present invention, the liquid acid etching effect creates small vugs in the permeable bed and makes it more permeable to the formation fluids, creating sweet spots around the stimulated well. The increased permeability stimulates the network of fractures in the unconventional reservoir. The stimulated network of fractures results in an increase in the flow of gases from the unconventional reservoir to the network of fractures and the well.

In some embodiments, the slurry-like hydraulic fracturing fluids of the present invention provide an alternative to conventional hydraulic fracturing for unconventional gas wells. The slurry-like fracturing fluid is used to fracture the unconventional gas formation instead of the conventional fracturing fluid and is left to cure within the induced fractures to become a permeable bed in the network of fractures. As this permeable bed attains the resting reservoir temperature, the solid acid in the permeable bed starts hydrolyzing with the water source. As the solid acid hydrolyzes and becomes liquid acid, it provides additional permeability to the reservoir by becoming a stimulating fluid within the permeable bed. The hydrolyzed, or liquid, acid starts etching the permeable bed filling the induced fractures, making the permeable bed conductive. The fractures in the reservoir which are filled with the slurry-like hydraulic fracturing fluids become permeable, thus allowing for commercial production from these unconventional gas wells. The use of a slurry-like fracturing fluid yields a network of permeable beds in a network of fractures bringing gas production to the well.

The materials used in the present invention are generally readily available and can be mixed in relevant proportions in the field for use in the slurry-like hydraulic fracturing fluids. The slurry-like hydraulic fracturing fluids can be pumped with higher pressure than the formation fracturing gradient, similar to traditional fracturing fluids.

In some embodiments, the present invention will reduce costs of hydraulic fracturing by eliminating the need to use expensive materials such as proppant, gel, gelling agents, cross linkers, and gel breakers. In some embodiments, the present invention will eliminate formation damage within a reservoir that is usually caused by fracturing gel. In further embodiments, the present invention eliminates problems related to proppant crushing, gel stability, formation damage, and lengthy cleanup procedures experienced with traditional fracturing fluids.

EXAMPLES

Example 1

A laboratory simulation has been conducted using a slurry-like fracturing fluid according to an embodiment of the invention. A slurry-like fracturing fluid was prepared using 30 g of calcium carbonate, 25 g of Portland cement, 20 g of solid acid (carboxylic acid), 15 g sand, and 10 g of bentonite. To this was added a sufficient amount of water as the slurry water to create the slurry-like fracturing fluid. The slurry-like fracturing fluid was cast in a plug and loaded in core flooding rigs. Reservoir level stress was applied. The applied stress on the sample was 2000 psi, along with an upstream pressure of 1000 psi and downstream pressure (back pressure) of 500 psi. The plug sample's permeability was measured at increasing temperatures from room to reservoir conditions at 111° C. (231° F.). Permeability was measured according to the equation shown in Table 1.

TABLE 1

Steady State Permeability Analysis
K(md) = (CxQxmxL)/(DPxA)

| | |
|---|---|
| K (md) = | permeability |
| C = | 245 (constant for psi to mpa) |
| Q = | flow rate (cc/min) |
| m = | viscosity (centipoise) |
| L = | sample length (cm) |
| DP | Pressure(psi) difference b/w upstream & downstream |
| A = | Area (sq. cm) |
| Injection Fluid | NaCl (10%) |

Figure 2:
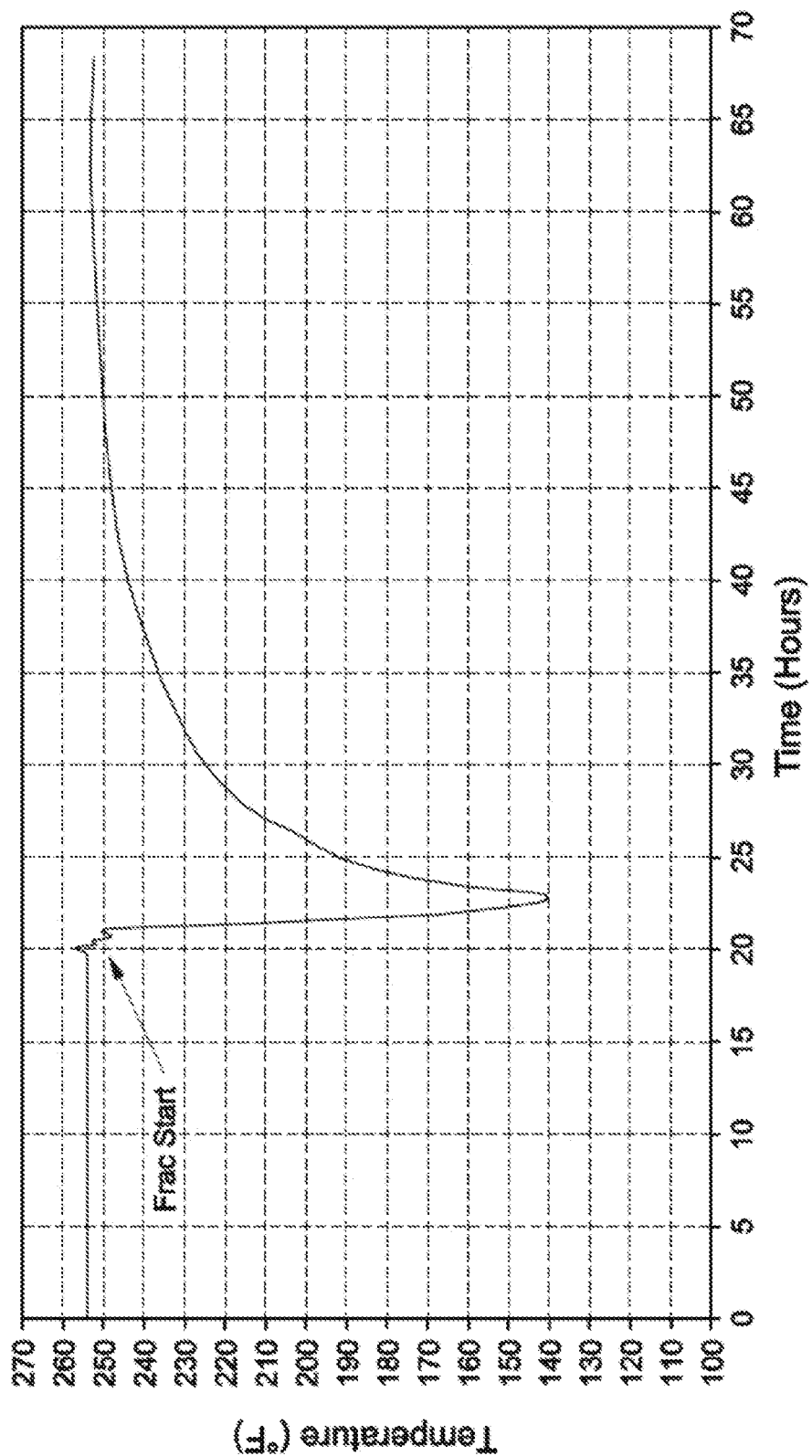
FIG. 2 shows the reservoir temperature during acid fracturing of a reservoir according to an embodiment of the invention.

The permeability results are shown in in FIG. 1. As can be seen in FIG. 1, permeability increased from less than 0.05 mD at room temperature to about 0.4 mD after the temperature reached 111° C. (231° F.). It should be noted that reservoir temperature during hydraulic fracturing will not be reached instantly by the fracturing fluid; rather temperature progressively increases. This progressive temperature increase was measured in a stimulation treatment as shown in FIG. 2.

Figure 3:
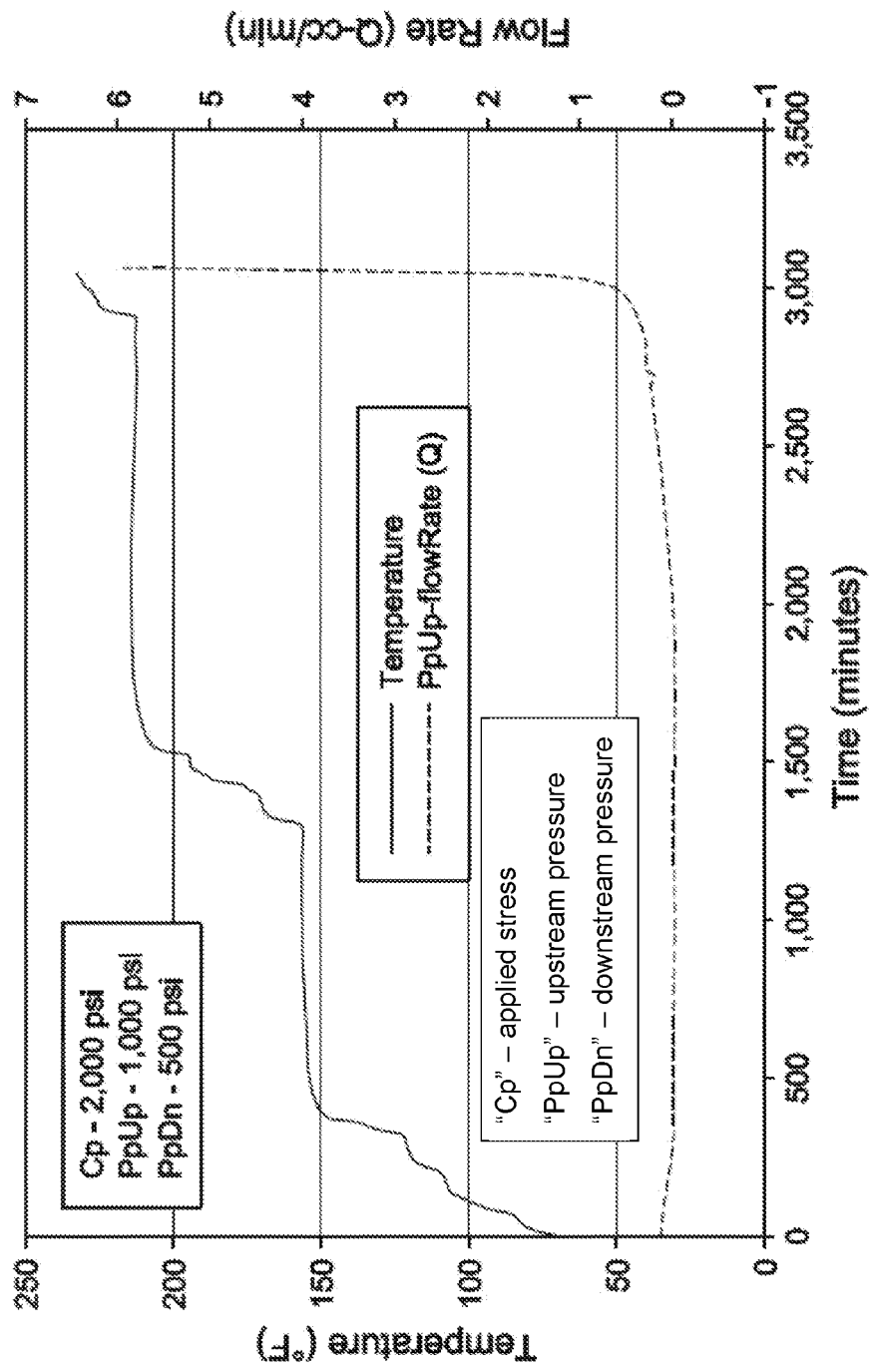
FIG. 3 shows the temperature and flow rate versus time of a slurry-like fracturing fluid according to an embodiment of the invention.

During the experiment of permeability measurement, the temperature of the sample was gradually increased to reach the reservoir temperature of 111° C. FIG. 3 shows the temperature profile with the flow rate going through the solid sample of the slurry-like fracturing fluid sample. This analysis confirmed that flow increased sharply through the sample when the temperature of 111° C. was reached, confirming that permeability of the sample improved rapidly at this temperature.

The experimental conditions were monitored over time at certain temperatures. At these temperatures, the flow rate, viscosity, and permeability of the slurry-like fracturing fluid were analyzed. The data are summarized in Table 2.

TABLE 2

| Step | Temp (° C.) | Q-Flow rate (ccc/min) | Viscosity (microPascal) | Viscosity (cP) | Permeability |
|---|---|---|---|---|---|
| 1 | 20 | 0.16 | 1,042.10 | 1.0421 | 0.0394 |
| 2 | 30 | 0.16 | 833.10 | 0.8331 | 0.0315 |
| 3 | 40 | 0.11 | 685.70 | 0.6857 | 0.0184 |

TABLE 2-continued

| Step | Temp (° C.) | Q-Flow rate (ccc/min) | Viscosity (microPascal) | Viscosity (cP) | Permeability |
|---|---|---|---|---|---|
| 4 | 50 | 0.05 | 576.7 | 0.5767 | 0.0066 |
| 5 | 60 | 0.04 | 493.90 | 0.4939 | 0.0043 |
| 6 | 70 | 0.02 | 429.30 | 0.4293 | 0.0018 |
| 7 | 80 | 0.01 | 377.80 | 0.3778 | 0.0012 |
| 8 | 90 | 0.01 | 336.00 | 0.3660 | 0.0007 |
| 9 | 100 | 0.32 | 301.6 | 0.3016 | 0.0235 |
| 10 | 110 | 2.76 | 272.90 | 0.2729 | 0.1836 |
| 11 | 111 | 5.00 | 272.90 | 0.2729 | 0.3326 |
| 12 | 111 | 5.96 | 272.90 | 0.2729 | 0.3965 |

Example 2

A laboratory simulation was also conducted using a slurry-like fracturing fluid, as in Example 1. A second slurry-like fracturing fluid was prepared using 40 g of calcium carbonate, 25 g of Portland cement, 20 g of solid acid (carboxylic acid), and 15 g sand. To this was added a sufficient amount of water to create the slurry-like fracturing fluid. The slurry-like fracturing fluid was cast in a plug and loaded in core flooding rigs. Reservoir level stress was applied. The applied stress on the sample was 2000 psi, along with an upstream pressure of 1000 psi and downstream pressure (back pressure) of 500 psi. The plug sample's permeability was measured at increasing temperatures from room to reservoir conditions at 111° C. (231° F.). Permeability was measured according to the equation shown in Table 2. The results are shown in Table 3.

TABLE 3

| Temperature ° C. | Q-flow Rate cc/min | Viscosity (micro Pascal) | Viscosity (cP) | Permeability (md) |
|---|---|---|---|---|
| 20 | 0.060 | 1042.1 | 1.0421 | 0.00647 |
| 30 | 0.100 | 833.5 | 0.8335 | 0.00862 |
| 40 | 0.125 | 685.7 | 0.6857 | 0.00886 |
| 50 | 0.150 | 576.7 | 0.5767 | 0.00895 |
| 60 | 0.189 | 493.9 | 0.4939 | 0.00965 |
| 70 | 0.223 | 429.3 | 0.4293 | 0.00990 |
| 80 | 0.253 | 377.8 | 0.3778 | 0.00988 |
| 90 | 0.276 | 336.0 | 0.3360 | 0.00959 |
| 100 | 0.309 | 301.6 | 0.3016 | 0.00964 |
| 110 | 0.341 | 272.9 | 0.2729 | 0.00962 |
| 120 | 0.392 | 248.9 | 0.2489 | 0.01009 |
| 20 | 0.107 | 1042.1 | 1.0421 | 0.01153 |

Figure 4:
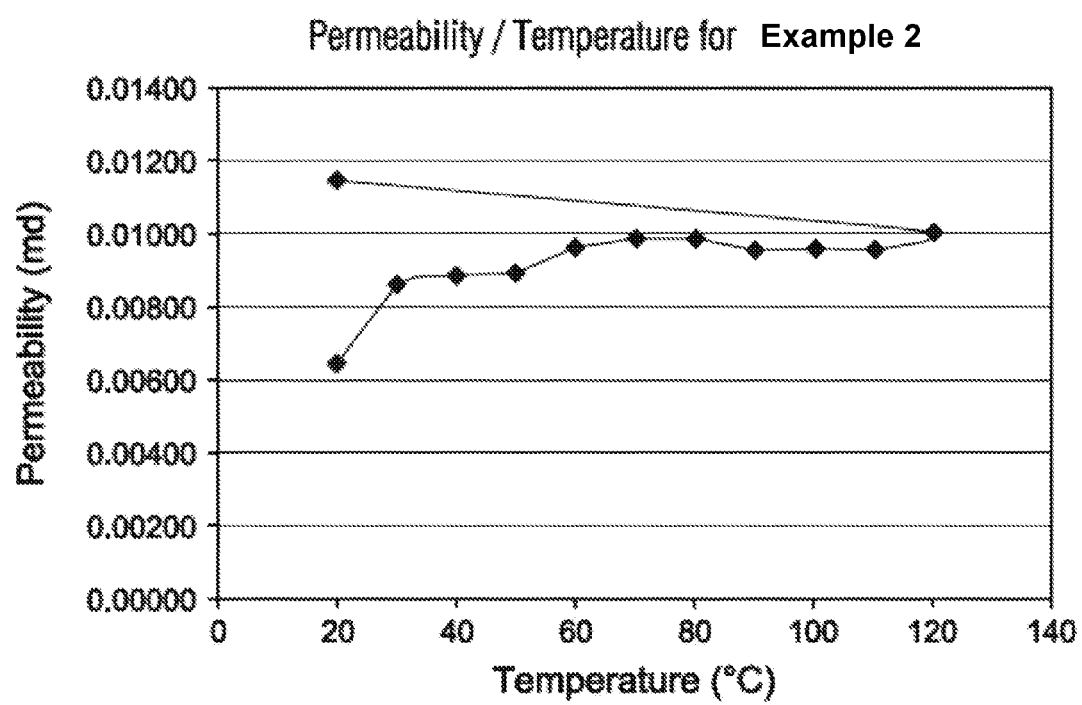
FIG. 4 shows the permeability of a slurry-like fracturing fluid according to an embodiment of the invention from room temperature to reservoir temperature.

As shown in FIG. 4, the permeability improved as the temperature approached the reservoir temperature and the permeability improvement continued, confirming that the stimulation was due to solid acid hydrolyzing and stimulating the cured slurry bed.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

That which is claimed is:

1. A method of using a slurry fracturing fluid for hydraulic fracturing in an unconventional reservoir, wherein the unconventional reservoir is selected from the group consisting of tight sands, shale gas, shale oil, coalbed methane, tight carbonate, and gas hydrate; the method comprising the steps of:
   injecting the slurry fracturing fluid into the unconventional reservoir,
      wherein the slurry fracturing fluid comprises a particulate portion and a water portion, the water portion operable to adjust a viscosity of the slurry fracturing fluid, such that the slurry fracturing fluid is capable of being pumped into the unconventional reservoir and the slurry fracturing fluid is capable of fracturing the unconventional reservoir,
      wherein the particulate portion comprises:
         a calcium carbonate component;
         a cement component;
         a sand component;
         a bentonite component; and
         a solid acid component;
      wherein injecting the slurry fracturing fluid is operable to generate a network of fractures in the unconventional reservoir and is operable to fill the network of fractures in the unconventional reservoir;
   reducing a reservoir temperature from a first reservoir temperature to a reduced temperature by injecting the slurry fracturing fluid into the unconventional reservoir;
   permitting the slurry fracturing fluid to cure into a permeable bed in the network of fractures in the unconventional reservoir, wherein the permeable bed is a solid porous carbonaceous bed filling the network of fractures in the unconventional reservoir;
   allowing the reduced reservoir temperature to return to the first reservoir temperature, wherein the first reservoir temperature is operable to trigger hydrolysis of the solid acid component with a water source, where the reduced reservoir temperature increases toward the first reservoir temperature while the slurry fracturing fluid cures into the permeable bed in the network of fractures, filling the network of fractures in the unconventional reservoir;
   hydrolyzing the solid acid component with the water source at about the first reservoir temperature, wherein the hydrolysis of the solid acid component is operable to produce a liquid acid; and
   stimulating the network of fractures in the unconventional reservoir with the liquid acid, such that the liquid acid etches the permeable bed creating small vugs in the permeable bed, and the liquid acid etches the unconventional reservoir thereby increasing permeability of the permeable bed by about at least 2 times relative to an initially cured solid porous carbonaceous bed in the network of fractures in the unconventional reservoir.

2. The method of claim 1 wherein the calcium carbonate component is obtained from a naturally occurring source.

3. The method of claim 1 wherein the cement component is Portland cement.

4. The method of claim 1 wherein the sand component is a silica based sand.

5. The method of claim 1 wherein the bentonite component is selected from the group consisting of potassium bentonite, sodium bentonite, calcium bentonite, aluminum bentonite, and combinations thereof.

6. The method of claim 1 wherein the solid acid component is selected from the group consisting of sulfamic acid, chloroacetic acid, carboxylic acid, trichloroacetic acid, and combinations thereof.

7. The method of claim 1 wherein the particulate portion is between 20-80% wt. calcium carbonate component, 5-30% wt. cement component, 5-30% wt. sand component, 2-10% wt. bentonite component, and 5-30% wt solid acid component.

8. The method of claim 1 wherein the particulate portion is 30% wt. calcium carbonate component, 25% wt. cement component, 15% wt. sand component, 10% wt. bentonite component, and 20% wt solid acid component.

9. The method of claim 1 wherein the water portion comprises brine.

10. The method of claim 9 wherein the brine comprises potassium chloride.

11. The method of claim 1 wherein the water portion comprises a salt solution.

12. The method of claim 11 wherein the salt solution is a potassium chloride solution.

13. The method of claim 1 wherein the solid acid component is encapsulated.

14. The method of claim 1 wherein the water source is a formation brine.

15. The method of claim 1 wherein the water source is the water portion.

16. The method of claim 1 wherein the unconventional reservoir is a tight sand reservoir.

17. The method of claim 1 wherein the unconventional reservoir is a shale reservoir.

18. The method of claim 1 wherein the first reservoir temperature is greater than 100° C.

19. A method of using a slurry fracturing fluid for hydraulic fracturing in an unconventional reservoir, wherein the unconventional reservoir is selected from the group consisting of tight sands, shale gas, shale oil, coalbed methane, tight carbonate, and gas hydrate; the method comprising the steps of:
  injecting the slurry fracturing fluid into the unconventional reservoir,
    wherein the slurry fracturing fluid comprises a particulate portion and a water portion, the water portion operable to adjust a viscosity of the slurry fracturing fluid, such that the slurry fracturing fluid is capable of being pumped into the unconventional reservoir and the slurry fracturing fluid is capable of fracturing the unconventional reservoir,
    wherein the particulate portion comprises:
      a calcium carbonate component, wherein the calcium carbonate component is 30 wt % of the particulate portion;
      a cement component, wherein the cement component is 25% wt. of the particulate portion;
      a sand component, wherein the sand component is 15% wt. of the particulate portion;
      a bentonite component, wherein the bentonite component is 10% wt. of the particulate portion;
      a solid acid component, wherein the solid acid component is 20% wt of the particulate portion;
    wherein injecting the slurry fracturing fluid is operable to generate a network of fractures in the unconventional reservoir and is operable to fill the network of fractures in the unconventional reservoir,
    reducing a reservoir temperature from a first reservoir temperature to a reduced temperature by injecting the slurry fracturing fluid into the unconventional reservoir;
  permitting the slurry fracturing fluid to cure into a permeable bed in the network of fractures in the unconventional reservoir, wherein the permeable bed is a solid porous carbonaceous bed filling the network of fractures in the unconventional reservoir;
  allowing the reduced reservoir temperature to return to the first reservoir temperature, wherein the first reservoir temperature is operable to trigger hydrolysis of the solid acid component with a water source, where the reduced reservoir temperature increases toward the first reservoir temperature while the slurry fracturing fluid cures into the permeable bed in the network of fractures, filling the network of fractures in the unconventional reservoir;
  hydrolyzing the solid acid component with the water source at about the first reservoir temperature, wherein the hydrolysis of the solid acid component is operable to produce a liquid acid; and
  stimulating the network of fractures in the unconventional reservoir with the liquid acid, such that the liquid acid etches the permeable bed creating small vugs in the permeable bed, and the liquid acid etches the unconventional reservoir thereby increasing permeability of the permeable bed by about at least 2 times relative to an initially cured solid porous carbonaceous bed in the network of fractures in the unconventional reservoir.

* * * * *